United States Patent [19]
Carr et al.

[11] Patent Number: 5,011,520
[45] Date of Patent: Apr. 30, 1991

[54] HYDRODYNAMIC FUME SCRUBBER

[75] Inventors: William J. Carr, San Jose; Raymond S. Krummen, Los Gatos, both of Calif.

[73] Assignee: Vector Technical Group, Inc., Santa Clara, Calif.

[21] Appl. No.: 451,306

[22] Filed: Dec. 15, 1989

[51] Int. Cl.⁵ .............................................. B01D 47/08
[52] U.S. Cl. ........................................ 55/228; 55/230; 55/233; 261/36.1; 261/98; 261/116; 261/DIG. 54
[58] Field of Search .............. 55/230, 233, 228, 257.5, 55/222, 223; 261/76, 98, 116, 36.1, 155, 3, DIG. 54, DIG. 75

[56] References Cited

U.S. PATENT DOCUMENTS

| | | | |
|---|---|---|---|
| 3,142,548 | 7/1964 | Krantz | 55/233 X |
| 3,348,830 | 10/1967 | Pearl et al. | 55/230 X |
| 3,406,953 | 10/1968 | Moore | 261/DIG. 54 |
| 3,699,748 | 10/1972 | Barkovitz | 55/233 X |
| 3,802,162 | 4/1974 | Deane | 55/230 |
| 3,834,127 | 9/1974 | Von Jordan et al. | 55/230 X |
| 4,203,935 | 5/1980 | Häckenjos | 261/98 |

Primary Examiner—Richard L. Chiesa
Attorney, Agent, or Firm—David B. Harrison

[57] ABSTRACT

A self-cleaning, hydrodynamic fume scrubber for scrubbing a gaseous phase effluent with a scrubbing liquid, includes an inlet stage for receiving the particulate laden gaseous effluent. A negative pressure stage creates suction by spraying a first pressurized component of the scrubbing liquid into a stream of the effluent passing from the inlet stage. A main scrubbing chamber includes at least one hydrodynamic spray assembly driven by a second pressurized component of the scrubbing liquid; a filter media layer disposed below the spray assembly for filtering and mixing the effluent gas and scrubbing liquid; a scrubbing liquid, scrubbed gas separation region below the filter media for separating and discharging scrubbed gas effluent collected therein; a splash plate or diverter plate at the lower boundary of the separation region; and, a scrubbing liquid reservoir below the splash plate in a lowermost region of the chamber for receiving excess scrubbing liquid. Scrubbing liquid is supplied to the scrubber from a source, and is discharged from the reservoir to a drain at a flow rate matching incoming scrubbing liquid flow.

18 Claims, 11 Drawing Sheets

HYDRODYNAMIC FUME SCRUBBER

FIELD OF THE INVENTION

The present invention relates to scrubbers for removing solubles from gaseous effluents. More particularly, the present invention relates to a hydrodynamic fume scrubber for effectively mixing a scrubbing liquid, such as tap water, with a highly toxic gaseous effluent in order to dissolve soluble components and to wet and carry away particulate components.

BACKGROUND OF THE INVENTION

Certain chemical vapor deposition processes, particularly those associated with large scale fabrication of epitaxial semiconductor devices, produce highly toxic effluent gases, such as dichlorosilane, trichlorosilane, phosphene, arsine, and hydrogen and nitrogen derivatives which have been changed within the fabrication reactor. These toxic gaseous effluents are typically heavily laden with e.g. silica particles which must be removed before the gases may be further processed, diluted and/or neutralized prior to discharge into the ambient envrionment. Other water soluble components present in the effluent include hydrochloric acid and residuals of phosphene and arsine.

Because of the high content of particulate components of the gaseous effluent, one significant drawback of prior art scrubbers is the susceptibility thereof to inlet plug-up and accumulation of clumps or masses of particulate matter. By "plug-up" herein is meant the formation of reaction residues when silicon-based gases come into contact with moisture. The reaction residues typically become formed and accumulate at the inlet of the scrubbing apparatus and plug it up.

Other portions and areas of the prior art scrubber have typically accumulated the clumps or masses of particulate matter and have required periodic cleanout. The buildup of massive particulate accumulations and residues not only diminishes scrubbing effectiveness, it also creates an explosion hazard. Clumps of residue which break off may result in a static electricity discharge sufficient to cause a spark and a resultant explosion in the hydrogen-rich environment. Also, larger pieces of residue and buildup may cause serious damage to and excessive wear in recirculation pumps which recirculate the scrubbing liquid throughout the scrubber process.

The prior art scrubbers have therefore typically required very frequent inlet plungings and periodic interior cleanings, usually carried out manually, in order to remove the deposited effluent costituents and prevent residue buildup with its concomitant explosion hazard. Not only are manual cleanings labor intensive, they may expose the operator to the toxic materials and require extensive precautions for operator safety, not to mention down-time of the scrubbing process itself. Prior art scrubbers typically require inlet plunging about twice per day, or even more frequently, depending upon the level of particulates present in the gaseous effluent stream and the rate of buildup at the input.

Once the gaseous effluent is drawn into the scrubbing apparatus, conventional scrubbing techniques may thereupon be applied to scrub the gas, i.e. dissolve the soluble components and wet and thereby remove the silica particulates. Typically, such prior techniques have included static water spray followed by passage of the effluent/scrubbing liquid through a filter medium. The filter medium is typically arranged to present maximum possible obstruction in wetted areas of the scrubber for a given distance travelled by the scrubbing liquid. One drawback of static water spray techniques is the tendency of the static spray to cause channels and tunnels to form through the filter media with concomitant loss in scrubbing efficiency.

Thus, a hitherto unsolved need has arisen for a fume scrubber which may be constructed from readily available, standard components and materials, which effectively draws a particulate-laden gaseous effluent stream into the scrubber without accumulation and blockage over time, and which effectively and efficiently scrubs the particles and solubles from the effluent stream in a continuous process without buildup of any residues or deposits and with very modest consumption of scrubbing liquid.

SUMMARY OF THE INVENTION WITH OBJECTS

A general object of the present invention is to provide a fume scrubber for scrubbing and wetting solubles and particulates within a gaseous effluent stream from a manufacturing process in a manner which efficiently and effectively overcomes the limitations and drawbacks of the prior art.

A more specific object of the present invention is to provide a fume scrubber for high particulate effluent streams which employs special packed filter media and hydrodynamic recirculating scrubbing liquid flow in a volume comprising a small fraction of the size of prior art fume scrubbers of comparable capacity.

Another specific object of the present invention is to provide a self cleaning hydrodynamic fume scrubber which may operate continuously for days and weeks without need for cleaning or maintenance.

One more specific object of the present invention is to provide an improved, non-clogging, self-cleaning input device for a fume scrubber which may operate continuously for days or weeks without need for plunging or cleaning.

One more specific object of the present invention is to provide a vertically staged hydrodynamic fume scrubber which employs a rotating spray bar assembly for hydrodynamic movement of scrubbing liquid throughout a region of filter media thereby minimizing the formation of flow channels or conduits through the filter media.

A further specific object of the present invention is to provide a double containment hydrodynamic fume scrubber which is constructed of process-inert standard size plastic piping, fittings and materials, including transparent portions enabling visual inspection of every stage of the scrubbing operation.

Yet another specific object of the present invention is to provide a hydrodynamic fume scrubber which may be adjusted in all operative parameters to optimize yield and productivity while minimizing consumption of scrubbing liquid, such as water in an open loop system or potassium permanganate solution in a closed loop system.

Yet another specific object of the present invention is to provide a fail safe hydrodynamic fume scrubber which operates on existing water pressure of a municipal water supply in the event of loss of recirculation pump pressure.

Yet a further specific object of the present invention is to provide open loop and closed loop fume scrubbers which operate as needed in synchronizm with a manufacturing process generating a gaseous effluent stream, in order to minimize consumption of operating power and scrubbing liquid.

In accordance with the principles of the present invention, a hydrodynamic fume scrubber is provided for scrubbing a gaseous phase effluent with a scrubbing liquid, such as water or a liquid phase scrubbing chemical. The fume scrubber includes an inlet stage for receiving the particulate laden gaseous effluent into the scrubber. A negative pressure providing stage creates a negative pressure (suction) by spraying a first pressurized component of the scrubbing liquid into a stream of the effluent passing from the inlet stage toward a constricted region functioning e.g. as a venturi. A main scrubbing chamber includes one or more hydrodynamic spray assemblies driven by a second pressurized component of the scrubbing liquid for hydrodynamically spraying the scrubbing liquid throughout an upper region of the chamber; a filter media layer disposed in a central region of the chamber for filtering and mixing the effluent gas and scrubbing liquid thereby to promote dissolution of components within the effluent which are soluble in the scrubbing liquid; a scrubbing liquid, scrubbed gas separation region within the chamber below the filter media means for separating and discharging scrubbed gas effluent collected therein; a splash plate or diverter plate at the lower boundary of the separation region for further breaking up particle masses formed within the scrubbing liquid as it drips from a lower surface of the filter media through the separation region; and, a scrubbing liquid reservoir below the splash plate means in a lowermost region of the chamber for receiving excess scrubbing liquid. The fume scrubber further comprises a scrubbing liquid supply for supplying scrubbing liquid to the scrubber from a source thereof, and a discharge for discharging scrubbing liquid from the reservoir at a flow rate approximating the flow rate of scrubbing liquid incoming from the supply.

In one aspect of the present invention, the hydrodynamic fume scrubber further includes one or more recirculation pumps for receiving a portion of the scrubbing liquid from the reservoir and for providing the first and second components of the scrubbing liquid under pressure respectively to the negative pressure providing device and to the hydrodynamic spray assembly.

In a further aspect of the present invention, the inlet stage comprises a structure defining a pressurized gas plenum region directly communicating with a source of the gas effluent and a scrubbing liquid chamber region directly below the gas plenum region and forming a gas-to-scrubbing liquid interface therewith, and a scrubbing liquid spillway formed at the interface for enabling flow of scrubbing liquid from the chamber region and concurrent passage of incoming gaseous effluent and a mixing gas from the plenum region therethrough, the gas plenum region being supplied with a mixing gas under pressure for mixing with the incoming gaseous effluent, and the scrubbing liquid chamber region being supplied with a portion of the scrubbing liquid.

In yet another aspect of the present invention, the negative pressure providing stage comprises a nozzle for directing the scrubbing liquid toward a flow region which is adapted to create the negative pressure and to promote mixture of the incoming gaseous effluent with the scrubbing liquid.

In one more aspect of the present invention, an outer container surrounds and provides secondary containment of the mixing chamber, the space between the outer container and the mixing chamber providing a temperature control plenum for regulating the ambient temperature in the mixing chamber. In this aspect, heat from the recirculation pump may be conducted in an airstream into the temperature control plenum thereby to heat the mixing chamber to prevent freezing of the scrubbing liquid during cold temperature operations of the fume scrubber.

In one more aspect of the present invention, a bypass flow path is provided for supplying the fume scrubber with scrubbing liquid from a direct supply thereof, such as the municipal water supply, in the event of loss of pressure from the recirculation pump.

In yet another aspect of the present invention, the filter media comprises a packed grouping of a multiplicity of discrete, generally spherical ribbed packing cells.

In still one more aspect of the present invention, the gaseous phase effluent originates in a sequenced manufacturing process and the fume scrubber includes an automatic sequencing controller responsive to the manufacturing process for automatically starting and stopping operation of the fume scrubber in response to the operating conditions of the manufacturing process.

In still another aspect of the present invention, the rotatable nozzle assembly comprises a plurality of spray arms evenly spaced about and extending from a peripheral manifold of the assembly.

In still one more aspect of the present invention, a baffle plate is provided in the scrubbing liquid reservoir in cooperation with an inlet to the recirculation pump for causing the scrubbing liquid collected therein to swash and circulate therein in order to prevent buildup of particulate residues scrubbed from the gaseous effluent, thereby further facilitating self-cleaning of the fume scrubber.

These and other objects, aspects, advantages and features of the present invention will be more fully understood appreciated upon consideration of the following detailed description of a preferred embodiment, presented in conjunction with the accompanying drawings.

DETAILED DESCRIPTION OF PREFERRED EMBODIMENTS

Figure 1:
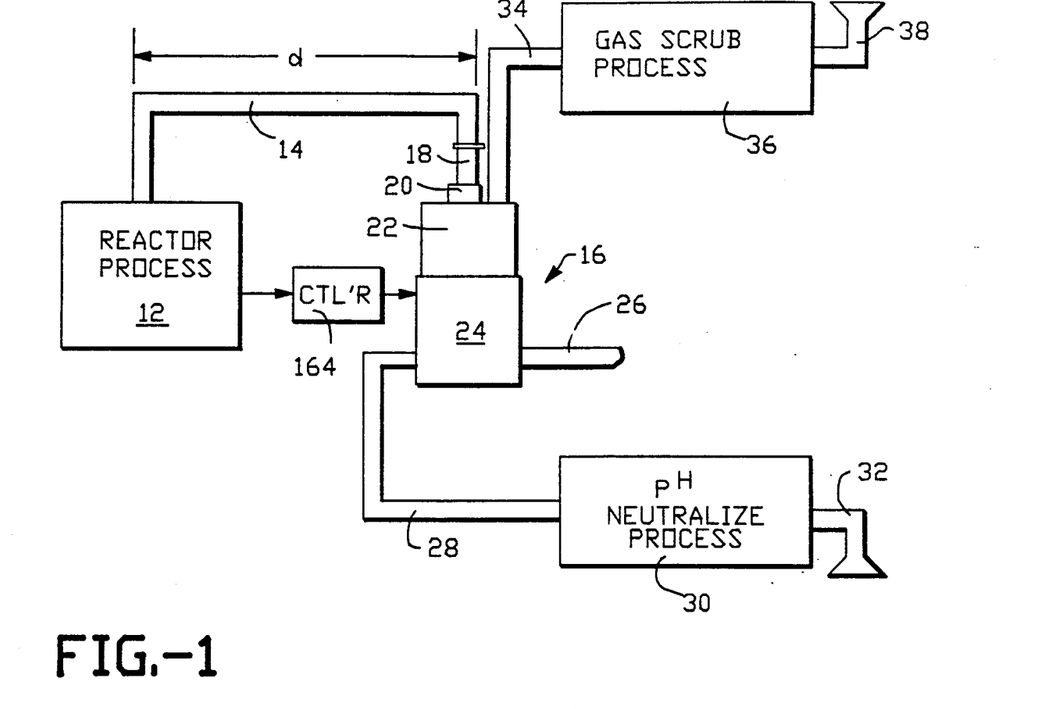
FIG. 1 is a block diagram of an effluent stream generating process including the hydrodynamic fume scrubber of the present invention.

With reference to FIG. 1, a manufacturing process 10 includes a reactor process 12, such as a chemical vapor deposition reactor of the type commonly employed in epitaxial semiconductor fabrication operations. The reactor process 12 typically generates and emits a gaseous effluent stream which is heavily laden with siliceous particulates. The gaseous effluent stream is piped in a non-corrosive conduit 14 to a hydrodynamic fume scrubber 16 constructed in accordance with principles of the present invention.

The scrubber 16 includes an inlet stage 18, a negative pressure generator stage 20, a main scrubbing chamber 22 and a base housing 24 for piping and recirculation pumping elements (not shown in FIG. 1). The scrubber 16 is preferably constructed of plastic pipes, fittings and sheet materials which are formed and glued together with suitable solvents so as to be chemically inert with regard to the contents of the gaseous effluent stream.

A scrubbing liquid, such as tap water from the municipal water supply, or from a reclamation reservoir (not shown), enters the scrubber via a supply pipe 26. A discharge pipe 28 carries discharged water solution containing solubles and wetted silica particles out of the scrubber. The viscosity of the discharged scrubbing water solution is very close to the incoming tap water and typically has a milky white appearance.

The pH of the solution is typically acidic, and a neutralization process 30 for increasing the pH to neutral (7) may therefore be included downstream from the scrubber 16. The spent scrubbing water is highly compatible with pumps located downstream which may be provided to move the water through subsequent reclamation processes, such as the pH adjustment process 30, for example. A discharge pipe 32 enables discharge of the neutralized, spent scrubbing water solution, either directly into the municipal sewer or into a local plant water reclamation and recycling process.

Scrubbed gaseous effluent leaves the fume scrubber 16 via a gas discharge conduit 34 and passes through a chemical neutralization processor 36 which may provide processes to 1 remove or reduce the level of toxic or harmful insoluble gaseous residues before being discharged via a conduit 3 into the ambient environment.

The length —d— of the conduit 14 between the reactor 12 and the fume scrubber 16 (FIG. 1) enables the conduit 14 to as a heat exchanger to the ambient; and it is made sufficiently long enough to enable the hot gaseous effluent to cool to a safe handling level before entering the fume scrubber 16. If necessary, positive heat exchanger techniques, such as fins or forced air, may be employed along the conduit 14 in order to increase convection cooling of the gaseous effluent stream to the ambient. Alternatively, the conduit 14 may be wrapped with a cooling coil or jacket thereby to increase cooling of the hot gaseous effluent by conduction.

Aspects of the hydrodynamic fume scrubber 16 are shown in greater structural detail in FIGS. 2, 3, 4, 5, 6, 7, 8, 9 and 10; and reference is now made to these figures for the following discussion.

Inlet Stage 18 and Negative Pressure Providing Stage 20

As previously noted, moisture contact with the gaseous effluent stream from a typical epitaxial reactor will result in precipitation of a particulate film mass which ordinarily will plug up a conventional scrubber inlet structure. The alternate constructions of the inlet stage 18 and negative pressure providing stage 20, depicted respectively in FIGS. 5, 6, and 6A have been innovated to provide an effective interface for mixing the gaseous effluent with moisture which does not result in plug-up due to resultant film precipitate.

Figure 5:
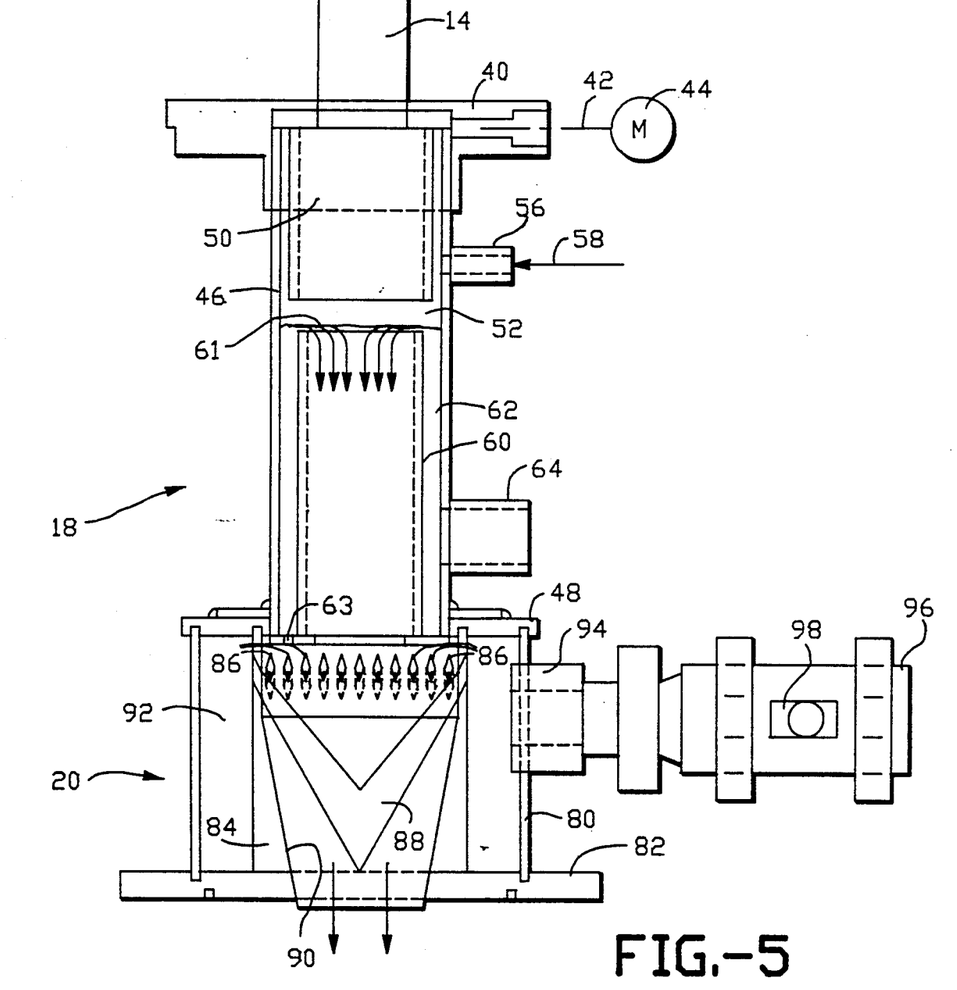
FIG. 5 is an enlarged and somewhat diagrammatic sectional view of the inlet and negative pressure providing elements of the FIG. 2 fume scrubber.

Structurally, the inlet stage 18 includes a top flange 40. A passageway radially extending through the flange communicates via a conduit tube 42 to a manometer 44 which is used to indicate visually to an operator the pressure of the incoming gaseous effluent stream within the conduit 14. An outer tube 46 extends downwardly to a lower flange 48. An upper inner tube 50 depends downwardly from the upper flange 40. The tube 50 is coaxially aligned with the outer tube 46 and has a relative length and diameter as illustrated in FIG. 5. The space between the oppositely facing walls of the outer tube 46 and the inner tube defines a gaseous plenum region 52.

An inert gas, such as nitrogen, is admitted into the gaseous plenum region 52. The inert gas is provided from a source, such as a portable pressure vessel (not shown) via a controllable pressure regulator 54 (FIG. 3) which includes a pressure indicator 56. A nipple 56 formed through the sidewall 46 of the inlet structure 18 enables connection to an inert gas conduit 58 leading from the pressure regulator 54 and gauge 56. The pressure of the inert gas is set by the valve 54 to be equal to the pressure of the incoming gaseous effluent stream, thereby establishing equilibrium within the plenum region 52. The provision of the inert dry nitrogen gas within the plenum region 52 assures that moisture is excluded therefrom, so that no contaminating films or clumps of particulates will precipitate within the gaseous plenum region 52. The inert gas also advantageously dilutes the concentration of non-soluble toxic gases which may also be present within the effluent stream.

A lower inner tube 60 extends vertically upwardly from the lower flange 48 in axial alignment within the outer tube 46. The upper circular edge 61 of the lower inner tube 60 is spaced away from the lower circular edge of the upper inner tube 50, as shown in FIG. 5. A scrubbing liquid plenum region 62 is defined between the oppositely facing sidewalls of the outer tube 46 and lower inner tube 60. A nipple 64 enables connection of a scrubbing liquid pipe 66 in order to supply scrubbing liquid to the liquid plenum region 62. The pipe 66 leads to a valve 68 and flow meter 70. The valve 68 enables the operator to set the flow rate of the scrubbing liquid (e.g. tap water) into the liquid plenum region 62, and into the scrubber 16 (the flow rate being set to correspond with the rate of discharge of scrubbing liquid from the conduit 28). The liquid flow is set so that scrubbing liquid cascades over the upper peripheral edge 61 of the lower inner tube 60 and into the tube 60 by gravity flow. Thus, the scrubbing liquid surface at the vicinity of the edge 61 forms the first moisture interface with the gaseous effluent.

A ring of precipitated material forms at the first moisture interface which lies along an annular water surface formed at and adjacently outward of the spillway peripheral edge 61. The precipitation ring is typically 30 to 50 thousandths in thickness, and it continually forms as gaseous effluent comes into contact with moisture along the edge 61. However, because the liquid flow cascades over the entirety of the spillway edge 61, as denoted by the downwardly pointing arrows in FIG. 5, the precipitated material grows inwardly and continuously breaks off and falls through the lower inner tube 60 in particulate clumps. A small opening 63 extends through a bottom wall defining the liquid plenum 62, thereby providing a controlled amount of circulation at the bottom of the plenum 62 and further preventing buildup of particulate contaminants. Thus, the FIG. 5 inlet device 18, when properly operating, is completely self cleaning, does not plug-up, and requires virtually no operator attention over long intervals of continuous use, other than to be sure that the various flow rates of effluent, inert gas and scrubbing liquid remain in proper equilibrium.

In operation, the scrubbing liquid is flowed into the liquid plenum region 62 at a rate of about two and one half gallons per minute after an initialization period of about five minutes when the flow is greater in order to enable the inner surfaces of the scrubber 16 to naturalize to the scrubbing liquid and to remove all contaminants. It is important during start-up to be sure that there are no air pockets or voids within the liquid plenum region 62 during start-up. To that end, the outer tube 46 and lower inner tube 60 are made of a transparent plastic material which enables the operator to view the entirety of the liquid plenum 62 to be sure that no air pockets are formed. During operation, the nominal scrubbing liquid (e.g. water) level is about one quarter of an inch above the upper edge 61 of the lower inner tube 60. This level is a function of the pressure set by the scrubbing liquid inlet valve 68. Once set, the inlet scrubbing liquid pressure should remain constant during scrubbing operations.

During operation of the fume scrubber 16, fresh scrubbing liquid (e.g. from the municipal water supply, or from a reclamation supply) enters the scrubber 16 at the plenum region 62, and all other scrubbing liquid needed for operation of the scrubber 16 is recirculated. If desired, an auxiliary fresh water supply may be provided directly to the main scrubbing chamber 22 via a valve 72, flow meter 74 and pipe 76.

The inert gas pressure gauge 56, control valves 54, 68 and 72, and the flow meters 70 and 74 are conveniently configured together at a fluid flow control panel 78 mounted on top of the scrubber 16, adjacent to the inlet device 18. The manometer 44 is also mounted on the top of the scrubber 16 for convenient viewing adjacent to the control panel 78, as suggested in FIGS. 2 and 3.

The FIG. 5 negative pressure (suction) stage 20 is conveniently formed at the bottom of the inlet device 18. This suction-providing stage 20 also advantageously mixes the effluent stream with the scrubbing liquid. An outer cylindrical wall 80 extends from the flange 48 to a mounting flange 82. An inner frustoconical structure 84 in axial alignment with the outer wall 82 and also extending between the flanges 48 and 82 defines a series of nozzle openings 86 in a horizontal ring at an upper end thereof. Each nozzle opening is directed downwardly to form a spray field 88 inside the structure 84. The inside surface 90 of the structure 84 converges to form a venturi.

A plenum 92 is formed between the outer wall 80 and the inner structure 84, and it is filled with scrubbing liquid under high pressure. In this manner a high volume of scrubbing liquid is supplied to the plenum 92 via a nipple 94 which connects to a pipe 96. A flow control valve 98 in the pipe 96 enables pressure and volume of the scrubbing liquid to be controlled by the operator. The pipe 96 leads to a recirculation pump 100. A high volume of scrubbing liquid (e.g. 40 gpm at 12 psi) passes through the plenum 92 and becomes sprayed into the spray field 88 by virtue of the nozzles 86. This spray action, together with the flow constriction 90, is adjusted to create suction sufficient to draw the gaseous effluent into the main scrubbing chamber 22 and simultaneously intimately to mix the effluent with the scrubbing liquid.

Figure 6:
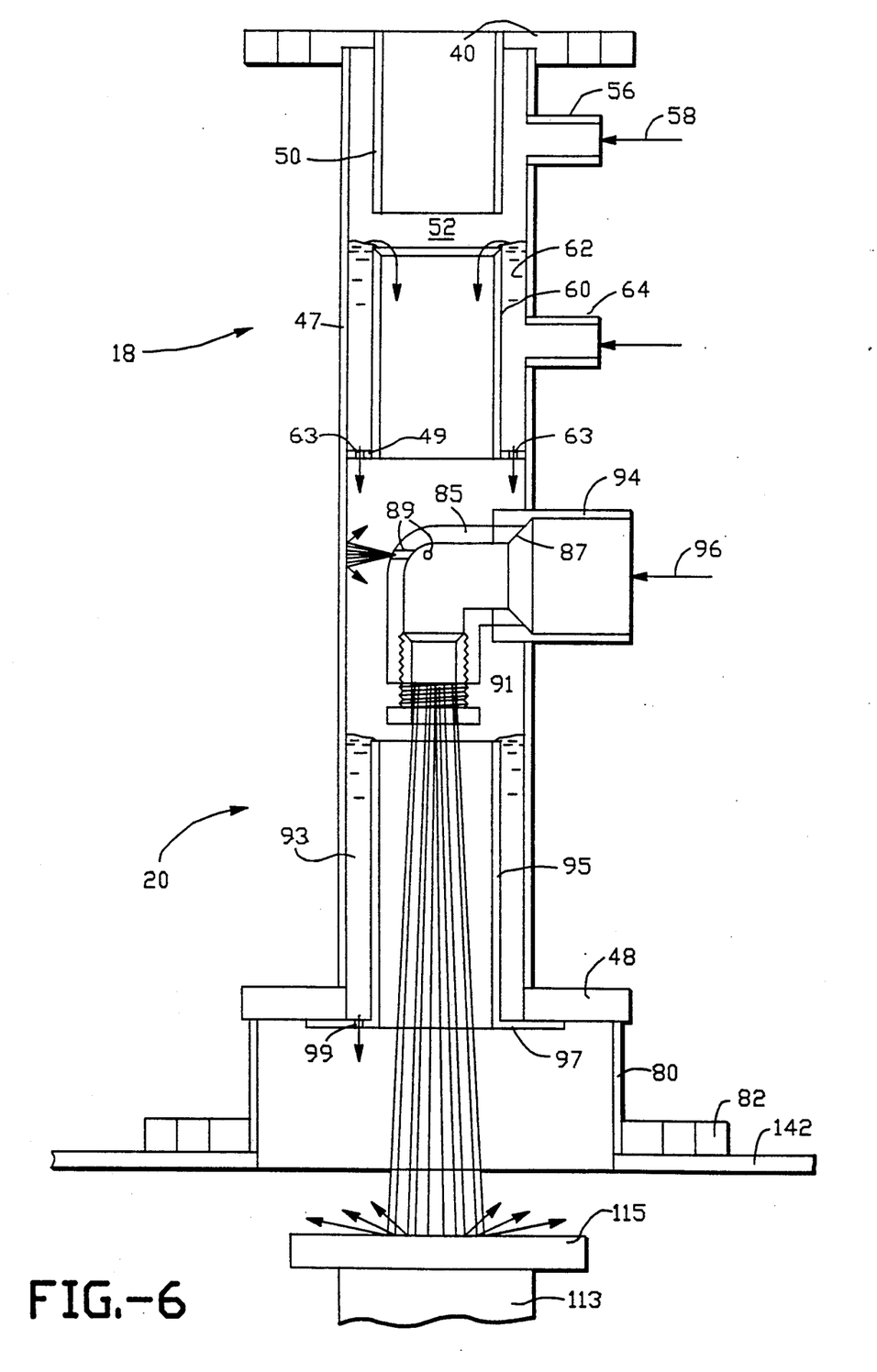
FIG. 6 is an enlarged and somewhat diagrammatic sectional view of an alternative preferred embodiment of the inlet and negative pressure providing elements of the FIG. 2 fume scrubber.

FIG. 6 depicts a simplified and more preferred inlet stage 19 and negative pressure providing stage 21. The same reference numerals are emloyed where the elements are substantially unchanged from the FIG. 5 embodiment. The FIG. 6 embodiment of inlet/negative pressure stages is most preferred because of its simplified construction and because in practice considerably greater negative inlet pressure is realized for the same flow of recirculating scrubbing liquid via the conduit 96 from the pump 100.

The FIG. 6 embodiment includes an elongated outer tube 47 which contains the inlet stage 18 and the negative pressure stage 20. The lower inner tube 60 within the inlet stage 20 includes an inwardly chamfered upper edge 63 which forms the spillway for the scrubbing liquid in the liquid plenum 62. The chamfer 63 also aids in breaking off the precipitate film which forms and grows inwardly at the surface of the liquid.

An annular plate 49 provides a bottom wall for the inlet stage 18. The outer edge of the plate 49 is glued to the inside wall of the elongated outer tube 47. One or more small orifices 63 enable some flow of scrubbing liquid at the bottom of the liquid plenum 62, thereby preventing buildup of particulates therein and providing self cleaning action within the plenum 62.

The negative pressure providing stage 20 is considerably simplified in the FIG. 6 embodiment. The high volume scrubbing liquid recirculation supply line fitting 94 extends through a lower portion of the elongated outer tube 47 as shown in FIG. 6. An elbow fitting 85 includes a chamfered edge 87 which constricts the flow passage and increases the velocity of flow of the recirculating scrubbing liquid. Small orifices 89 are provided in the curved portion of the elbow fitting 85 in order to supply a self-cleaning spray within the interior of the elongated outer tube 47 at the vicinity of the elbow fitting 85.

A further constriction to the main flow path is provided by a threaded size reducer 91 which threads into a downwardly dependent portion of the elbow fitting 85. The size reducer fitting 91 acts as a nozzle and directs a high velocity stream of recirculating scrubbing liquid downwardly through an inner tube 95. An upper edge of the inner tube 95 is spaced away from the lower edges of the nozzle fitting 91 about one quarter of an inch which provides a space through which the gaseous effluent—water mixture falling downward from the inlet stage 18 is drawn by the negative pressure generated by the flow of recirculating scrubbing liquid from the nozzle 91. A liquid plenum 93 between the outer elongated tube 47 and the inner tube 95 fills with scrubbing liquid and overflows over the top of the tube 95, thereby providing self cleaning at the negative pressure stage 20. A small orifice 99 enables some flow at the bottom of the plenum 93 thereby to promote circulation and self cleaning. The flow from the nozzle 91 strikes a flat plate 115 of a rotating spray bar assembly 110 within the main chamber 22, hereinafter to be described in greater detail.

Figure 6A:
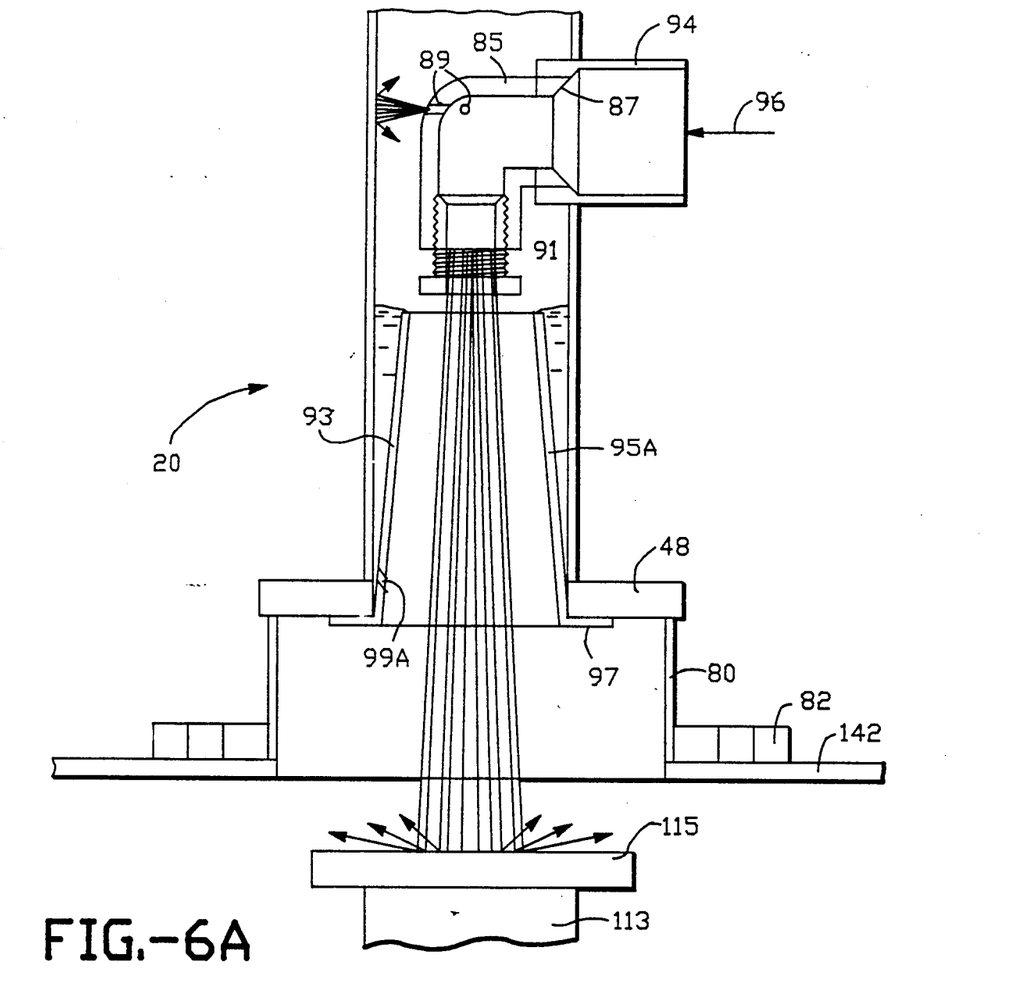
FIG. 6A is an enlarged and somewhat diagrammatic sectional view of yet another presently preferred configuration for the negative pressure providing element very similar to the FIG. 6 embodiment.

The FIG. 6A modification to the tube 95 is slight. The tube 95a is made as in frustoconical section with the bottom diverging to the ring 97 which becomes a flange for the tube 95a. A small orifice 99a is provided through the wall of the frustoconical tube 95a to provide the drainage function previously described to the orifice 99. The FIG. 6A embodiment provides slightly better misting and a somewhat higher vacuum (draw) than achieved with the FIG. 6 embodiment.

Main Chamber 22

Figure 2:
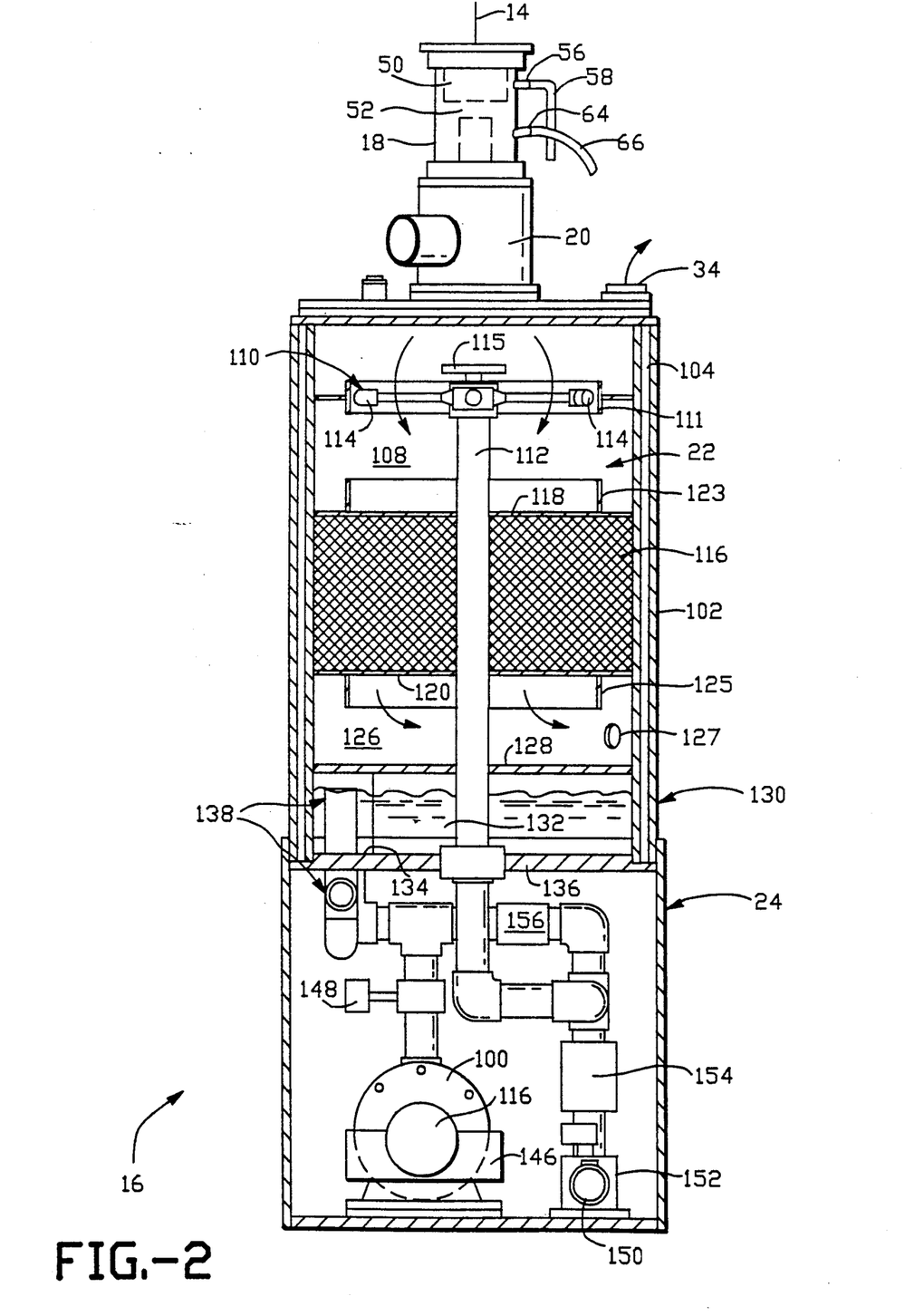
FIG. 2 is a somewhat diagrammatic front view in elevation and partial section of a hydrodynamic fume scrubber which incorporates principles of the present invention.
Figure 3:
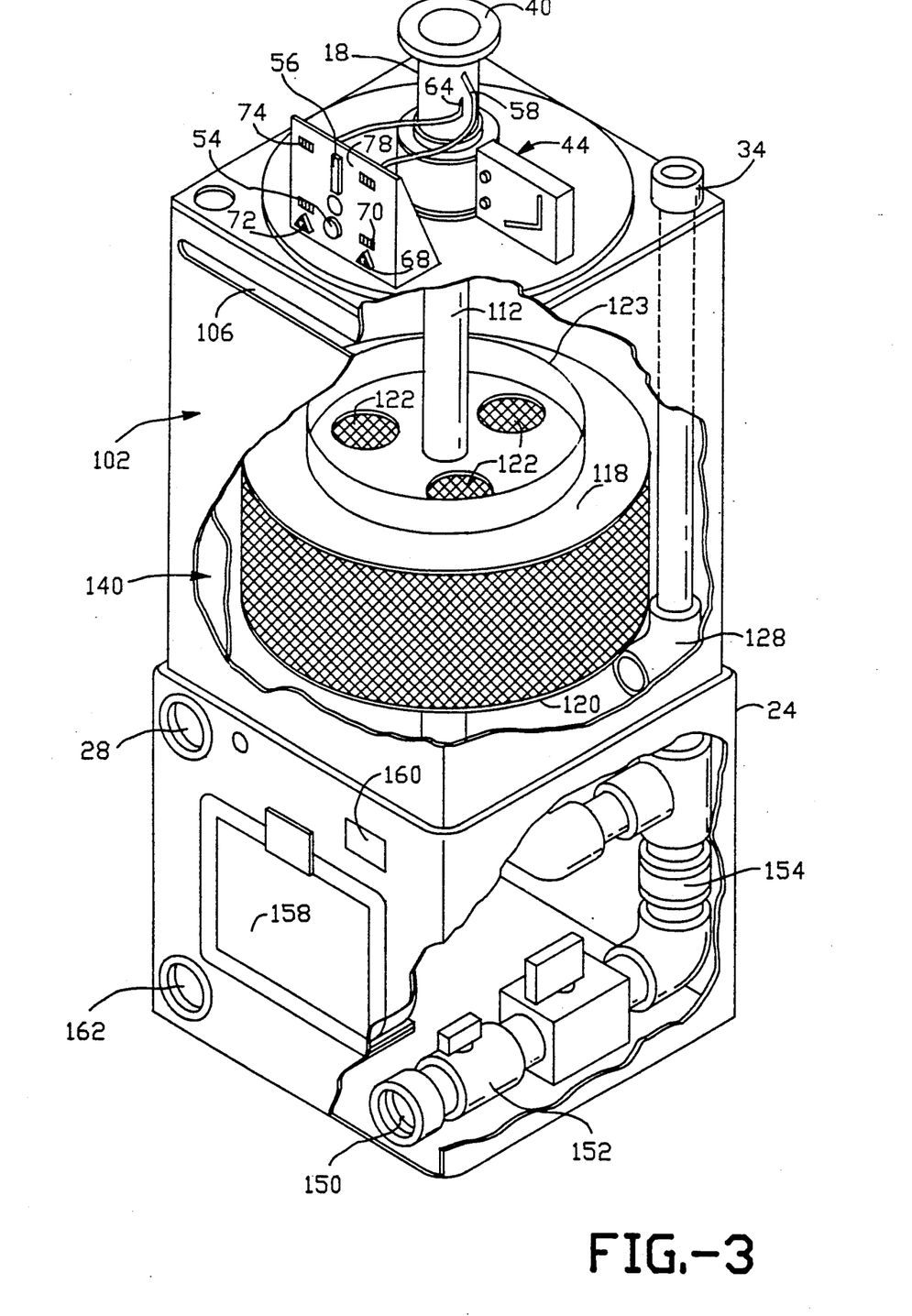
FIG. 3 is a somewhat diagrammatic isometric view of the FIG. 2 fume scrubber with portions thereof broken away to reveal some of the structural elements thereof.
Figure 4:
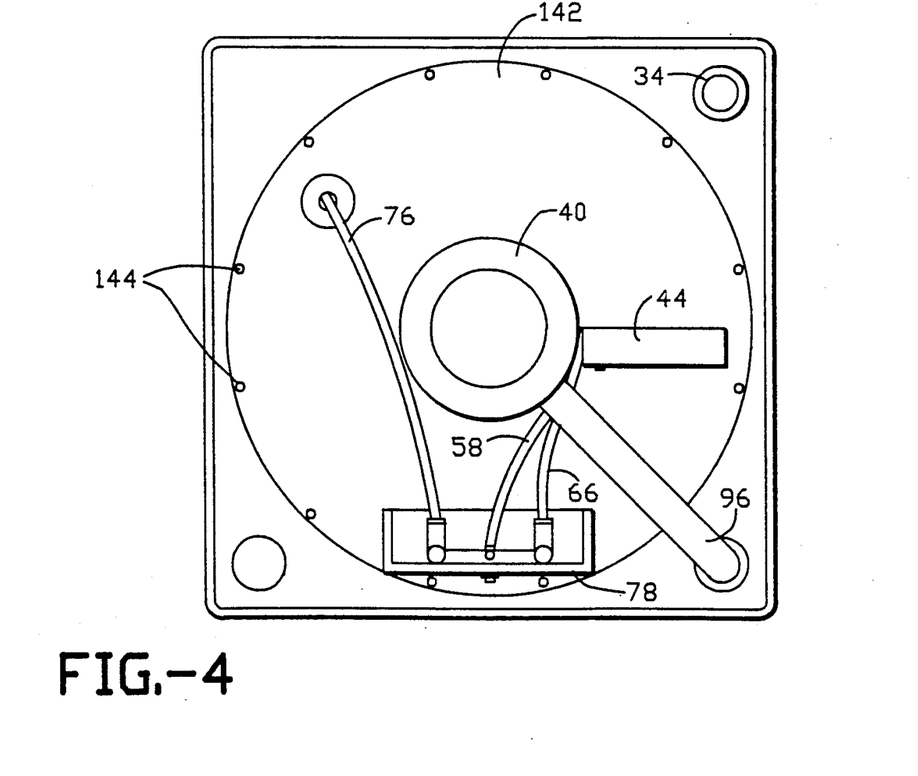
FIG. 4 is a top plan view of the FIG. 2 fume scrubber.
Figure 10:
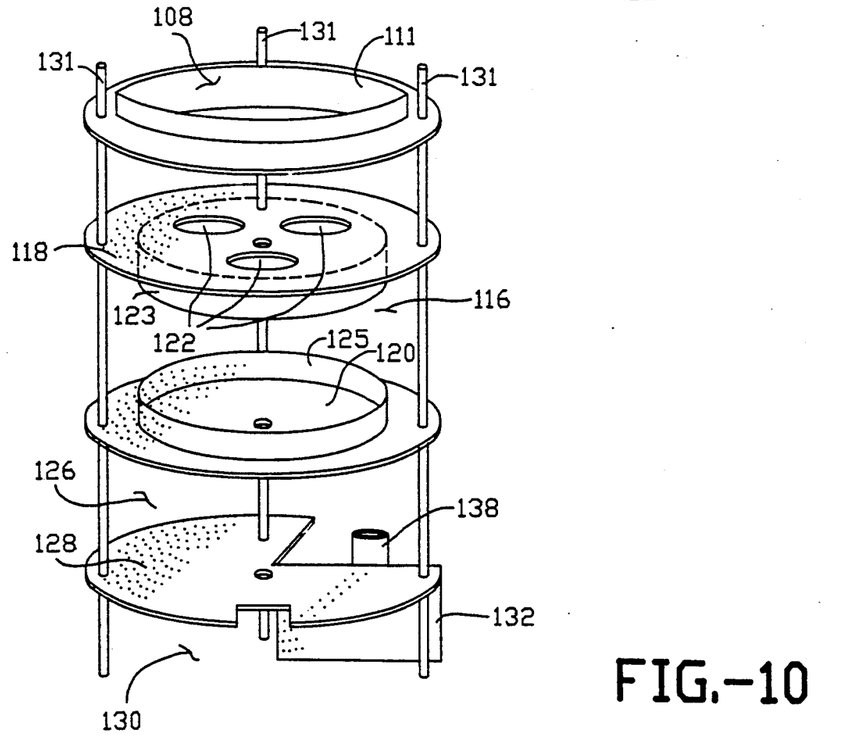
FIG. 10 is a somewhat diagrammatic, isometric view of a baffle plate construction used within the FIG. 2 fume scrubber to define and provide descrete process regions within the main scrubbing chamber thereof.

Turning to FIGS. 2, 3 and 10, a generally rectangular outer housing 102 contains the cylindrical main scrubbing chamber 22 and also forms an enclosed heating plenum 104. Hot air drawn through an air cooled pump motor 106 is directed through the plenum 104 in order to provide heating to the scrubbing chamber 22. This arrangement efficiently enables continued operation of the scrubber 16 with water as the scrubbing liquid at or near freezing ambient temperatures during the winter months. An exhaust slot 106 in the outer housing 102 (FIG. 3) enables the warmed air to exit the heating plenum 104.

The main scrubbing chamber includes four separate process regions which are separated by the top and bottom walls of the cylindrical structure forming the scrubbing chamber and by four stacked annular plate structures as shown in FIG. 10 which will be discussed hereinafter in greater detail.

Figure 8:
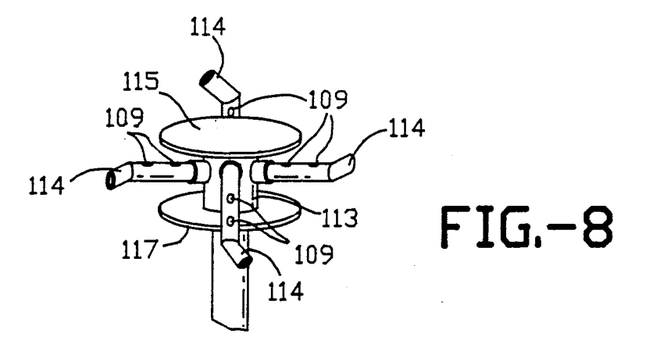
FIG. 8 is a somewhat diagrammatic, isometric view of a rotating spray bar assembly used within the FIG. 2 fume scrubber.

An upper region 108 contains a rotating spray bar assembly 110 which is surrounded by an annular reaction wall 111. A central conduit 112 supplies scrubbing liquid at high volume to the spray bar assembly 110. The spray bar assembly 110 includes e.g. four spray bars, each terminating with a nozzle 114, each being angled relative to its spray bar as shown in FIG. 8. Spray of recirculating scrubbing liquid emanating from openings at the ends of the nozzles 114 strikes the reaction wall 111 with the result that the assembly 110 rotates. Additional orifices 109 in the spray bars, which are smaller than the end openings of the nozzles 114, result in some spray being directed upwardly within the upper region.

Figure 9:
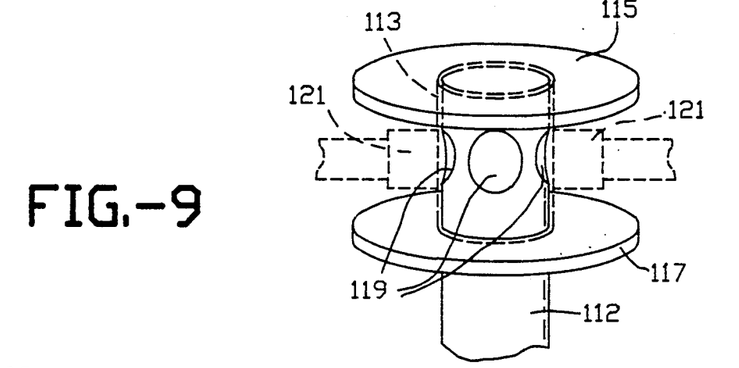
FIG. 9 is an enlarged detail view of the rotating spray bar assembly hub shown in FIG. 8, with the rotating spray bar shown in place in phantom outline by dashed lines.

The spray bar assembly 110 is formed with a cylindrical hub 113 which is sized so as to rotate freely about an upper portion of the central conduit 112. A top plate 115 and a bottom plate 117 are glued to the conduit 112 and thereby register the hub 113 in proper alignment with multiple oversized openings 119 as shown in FIG. 9. The openings 119 generally align with openings defined by four fittings 121 which are glued to the hub 113 and from which the spray bars and nozzles 114 extend about the conduit 112. Openings (not shown) between the conduit 112 and the assembly 110 enable the scrubbing liquid to pass from the conduit into the assembly.

The four nozzles 114 are directed to cause the assembly to rotate in reaction to the force from the flow of the scrubbing liquid through the nozzles. The angles of the nozzles 114 relative to the spray assembly and conduit 112 together with liquid flow rate adjust the rate of rotation of the assembly 110. Preferably, the spray bar assembly 110 rotates at approximately 300 revolutions per minute to assure intimate misting and spray throughout the main chamber during scrubbing operations. The scrubbing liquid provides a lubricating and cooling medium for the rotating hub 113 relative to the central conduit 112.

A second filter region 116 of the scrubbing chamber 22 is provided. The region 116 is defined between an upper perforate plate 118 and a lower perforate plate 120. Several large openings 122 in the upper plate 120 enable discrete filter media 124 to be packed into the region 116. Reinforcing rings 123 and 125 are glued respectively to the upper perforate plate 118 and to the lower perforate plate 120 to provide increased mechanical rigidity to the surfaces thereof.

Figure 7:
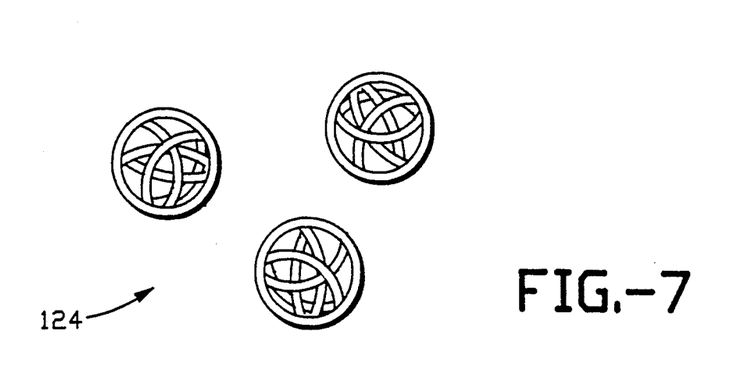
FIG. 7 is a diagrammatic view of three discrete filter media used within a filter region of the FIG. 2 fume scrubber.

The filter media 124 is comprised of plastic packing spheroids formed of open annular loops, as illustrated in FIG. 7. One suitable example of the filter media 114 is described in greater detail in U.S. Pat. No. 4,203,935, reference to which is made for further particulars. Jeager "Tri-Packs" work well for the media 124.

The filter media 124 is selected and packed together in a manner which provides maximized physical obstruction to the vertically falling scrubbing fluid flow for a given for a given vertical distance travelled and without undue obstruction or back pressure to the flow. The filter media 124 further breaks up any particulates and the clumps of precipitate and facilitates dissolution of solubles and wetting of wettables within the effluent stream so as to remove them from the gaseous stream by transfer to the scrubbing liquid.

Hydrodynamic action within the main chamber 22 is achieved by coaction of the rotating spray bar assembly 110 and the packed filter media 124. Since the scrubbing liquid is given a cyclonic effect by the spray arm assembly 110, the scrubbing liquid is in a constant and very even state of motion through the filter media 124. This hydrodynamic flow of scrubbing liquid throughout the filter media 124 prevents the development of courses and channels through the media and further enhances efficient scrubbing action over long operational cycles without operator or maintenance intervention.

A third process region 126 of the main scrubbing chamber 22 enables separation of scrubbed residual gas effluent and scrubbing liquid. A fitting 127 leads to the gas outflow conduit 34 and enables scrubbed gas effluent to be drawn from the region 126. The region 126 is defined by the lower perforate plate 120 of the filter region 116 and a perforate diverter plate 128. The diverter plate 128 is spaced from the lower filter plate 120 a sufficient distance so that drops of scrubbing liquid hit the diverter plate 128 with sufficient force to provide further breakup of particulates remaining undissolved in the scrubbing liquid.

A fourth region 130 of the central scrubbing chamber 22 provides a scrubbing liquid reservoir wherein scrubbing liquid collects. A vertical baffle plate 132 adjacent to a recirculation drain 134 through a bottom wall 136 of the chamber 22 causes the scrubbing liquid to circulate throughout the reservoir region 130 thereby further inhibiting deposition and buildup of scrubbed silica particulates, for example. This circulation-inducing structural arrangement further enhances self-cleaning feature of the scrubber 16 and thereby reduces the need for operator intervention-maintenance.

An overflow drain pipe 138 extends upwardly in the reservoir region 130 and communicates with the discharge pipe 28. As fresh scrubbing liquid is added to the scrubber 16 at the inlet device 18, the reservoir level rises and the excess (and now spent) scrubbing fluid therein exits the reservoir by spilling into the drain pipe 138 by gravity flow. Thus, in operation the scrubber consumes only about 2-3 gallons of scrubbing liquid per minute while achieving the efficiency of a conventional scrubber tower requiring 70 gallons per minute liquid flow, for example.

The main scrubbing chamber 22 is preferably formed as an elongated cylindrical tube 140 of transparent plastic material. A circular top cover 142 is bolted to the cylindrical tube 140 by explosion bolts 144. An O-ring gasket provides an airtight seal between the top cover and the tube 140. The reaction surface 111, upper perforated plate 118, lower perforated plate 120 and diverter plate 128 are preferably aligned and fabricated by the use of three pipe legs 131 as shown in FIG. 10. Then, the assembly so formed is inserted into the cylindrical tube chamber 140. The spray bar assembly 110 and central conduit 112 are then installed. The media 124 is then loaded into the region 116, and the top cover 142 may then be bolted in place, completing construction of the main scrubbing chamber 22.

Base Housing 24

The base housing 24 provides an enclosure for the centrifugal pump 100 and motor 106. The pump 100 has a capacity of 160 gallons per minute at 40 psi and has an impeller formed of reinforced plastic resin (fiberglass) so as to be inert to and unaffected by the chemicals that become dissolved or are otherwise carried by the scrubbing liquid. The pump 100 is directly driven by the motor 106 which is preferably an air cooled, one and one-half horsepower single phase ball bearing electric motor. A containment pan 146 surrounds the motor 106 to prevent short-out due to accumulation of scrubbing liquid in the secondary containment base housing 24.

An inlet to the pump 100 leads from the drain 134 in the bottomwall 136 of the main scrubbing chamber. The outflow through the pipe 96 leading to the negative pressure producing stage 20, and a second path leading through the pipe 112 to the rotating spray bar assembly 110. A pressure switch 148 monitors the pressure produced by the pump 100.

A standby bypass fluid flow path may be provided to enable continued operation of the scrubber 16 in the event that pressure from the pump 100, as sensed by the pressure switch 148, is lost. The standby path is best illustrated in FIGS. 2 and 3. A high flow rate inlet 150 from the scrubbing liquid supply (which is typically the municipal water supply or reclaimed water supply when water is the scrubbing liquid) leads through a normally open solenoid flow control valve 152. When power is applied to the motor 106 and operating pressure from the pump 100 is sensed at the pressure switch 148, the solenoid valve 152 closes off to prevent bypass flow. This is the normal operating condition. One way check valves 154 and 156 prevent backflow either to the inlet 150 or through the pump 100. In the event that pump pressure is lost, the solenoid valve 152 opens, and fluid flow directly from the municipal water supply then passes into the pipes 96 and 112. This enables the scrubber 16 to continue in operation, however at a very high consumption rate for the scrubbing liquid. In order to accomodate this bypass operational mode, the overflow drain 138 and discharge pipe 28 must be sized to handle the maximum liquid flow rate occurring during the emergency bypass mode. A removable hatch 158 normally closes the base 24, yet permits easy access to the pump 100, motor 106 and associated piping. An on-off switch 160 enables primary power to be switched on and off in order to operate the pump motor 106. An auxiliary drain 162 enables the interior of the secondary containment housing 24 to be drained, should that be necessary.

Since the fume scrubber 16 may be operating within a high hydrogen level environment, an explosion cage formed of perforated steel sheet (not shown) may be provided around the outer housing 102 as an additional protection for operating personnel.

Controller 164

Figure 11:
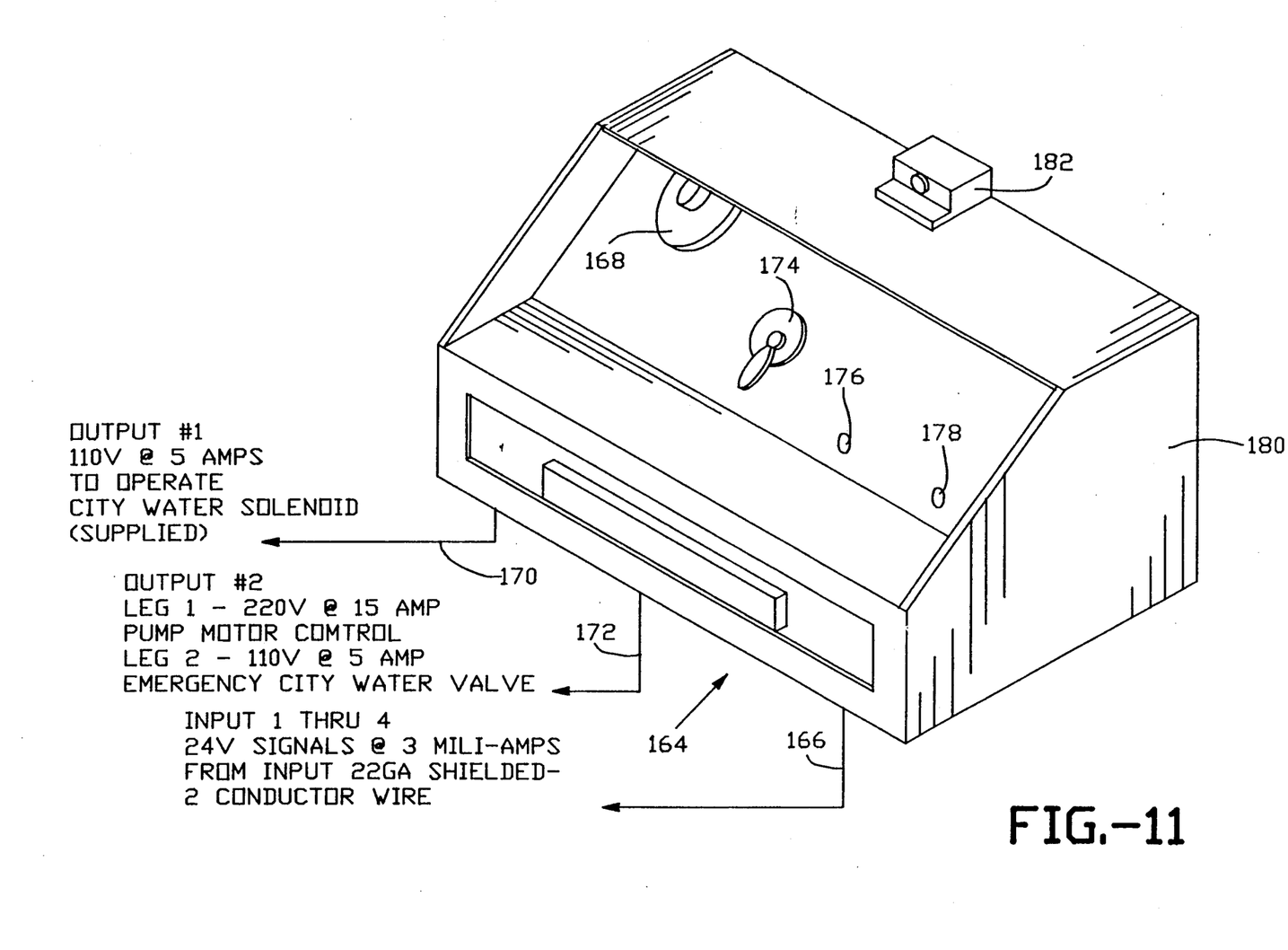
FIG. 11 is a somewhat diagrammatic view of a controller element for the FIG. 2 fume scrubber.

An automatic controller 164 for the fume scrubber 16 is depicted in FIG. 11. As shown in FIG. 1, the controller 164 is responsive to the reactor process 12. Control signals via a cable 166 enter the controller 164 and provide it with information relating to the operation of the process 12. The controller is informed when the process 12 starts and stops emitting a gaseous effluent stream, and the controller 164 thereupon controls operation of the scrubber 16 in order to conserve electrical power and scrubbing fluid, even when it is water. A controllable time delay circuit 168 enables the scrubber 16 to continue to operate for three to nine minutes after the process 12 has finished emitting the gaseous effluent stream. Output lines 170 and 172 lead to the motor 106 and to a scrubbing liquid solenoid valve feeding liquid to the inlet device 18; and, to the bypass solenoid valve 152. The controller 164 may also include other suitable switches and indicators, such as a system override switch 174, a system "on" indicator 176, and a system automatic mode "off" indicator 178. The controller 164 may be constructed in a suitable housing 180 which may be mounted to the side of the scrubber 16 by a suitable bracket 182.

High Capacity Scrubber 216

Figure 12:
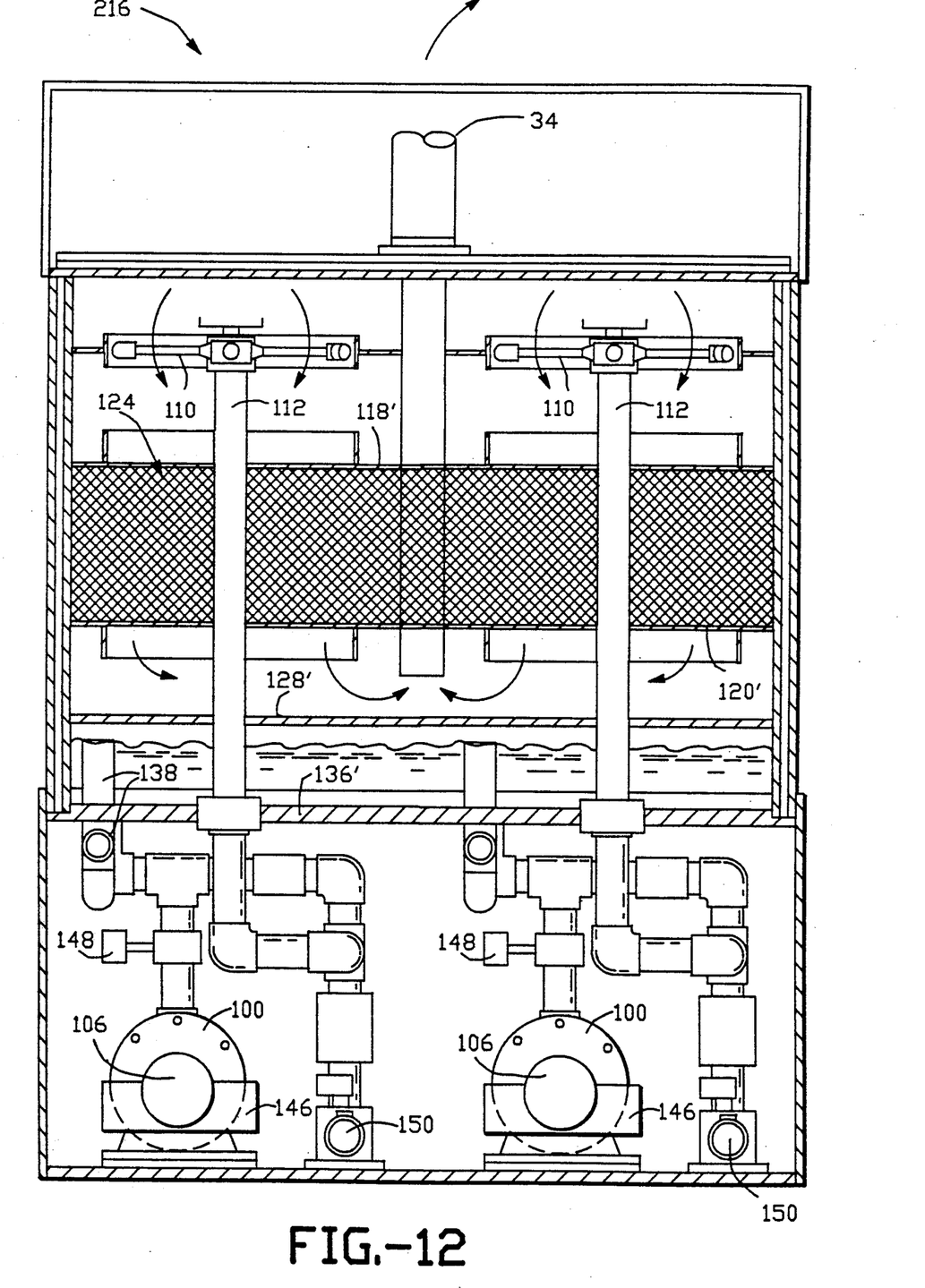
FIG. 12 is a somewhat diagrammatic view in front elevation and partial section of a high capacity fume scrubber in accordance with the principles of the present invention.
Figure 13:
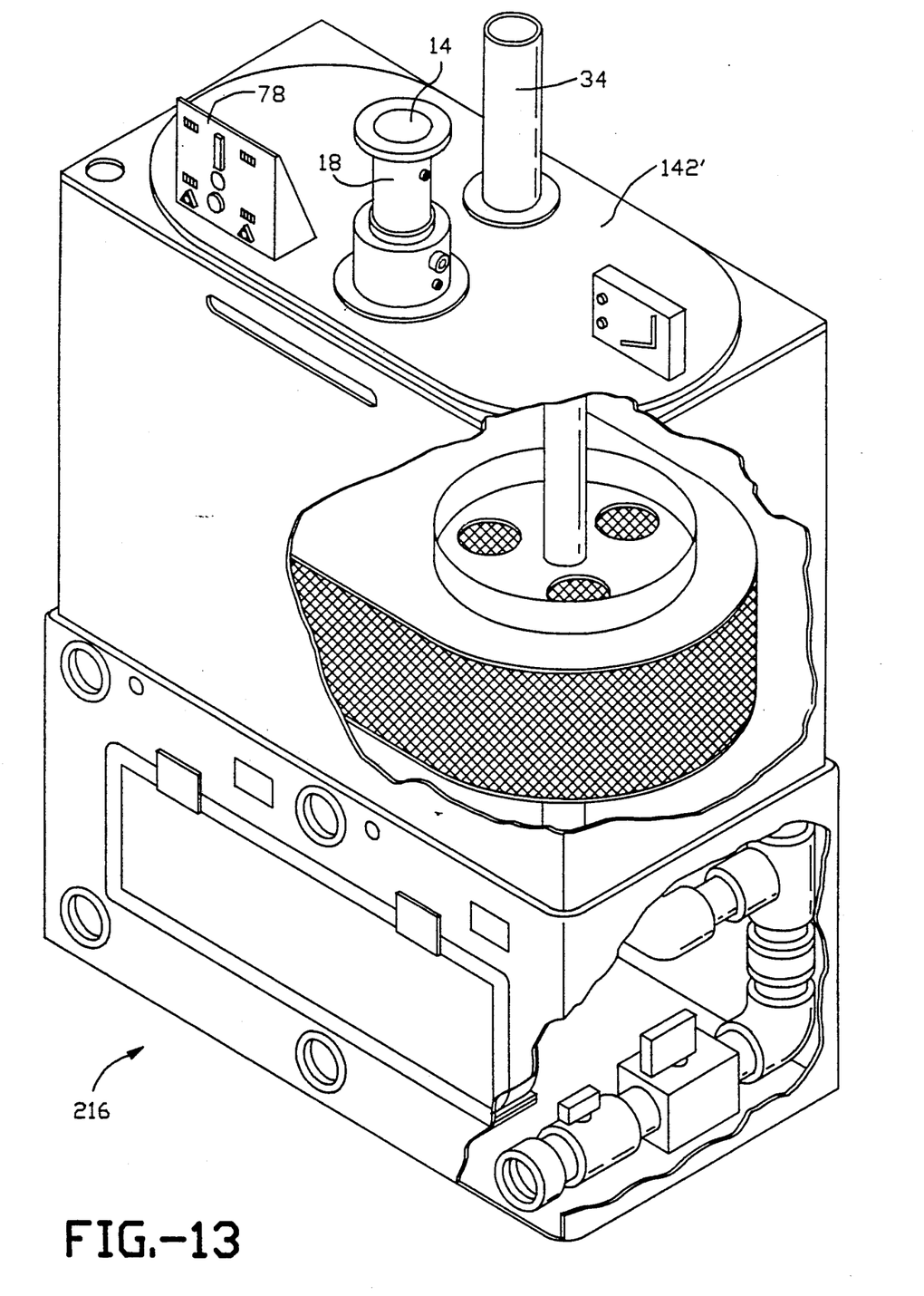
FIG. 13 is a somewhat diagrammatic isometric view of the FIG. 12 fume scrubber with portions thereof broken away to reveal some of the structural elements thereof.

Increased fume scrubbing capacity may be obtained by use of the scrubber 216 depicted in FIGS. 12 and 13 wherein elements common with the scrubber 16 bear the same reference numerals. The scrubber 216 employs a single inlet device 18 and negative pressure providing device 20, and has a single gaseous effluent outlet 34. An elongated oval shaped main scrubbing chamber 22 is equipped with two rotary spray bars 110 fed by two vertical feed pipes 112. Suitably sized, oval shaped elements 118', 120', 136' and 148' replace the circular elements of the same function in the scrubber 16. Two pumps 100 operating in parallel provide the required scrubbing liquid pressure to operate the negative pressure providing device and the spray bars 110. Otherwise, the scrubber 216 functions exactly as the scrubber 16; however, with increased fume scrubbing capacity and less cost per volume of effluent scrubbed.

Closed Loop Scrubber

In some processing conditions involving significant amounts of toxic materials present in the gaseous effluent, a closed loop fume scrubbing process may be required. Examples include ion implantation processes, CVD reactors and a variety of other commonly encountered pieces of semiconductor fabrication equipment. With additional apparatus, either the scrubber 16 or the scrubber 216 may be adapted to use liquid phase chemical scrubbing agents, such as $KMnO_4$ for example, for effectively scrubbing arsine, phosphine and diborane compounds.

Figure 14:
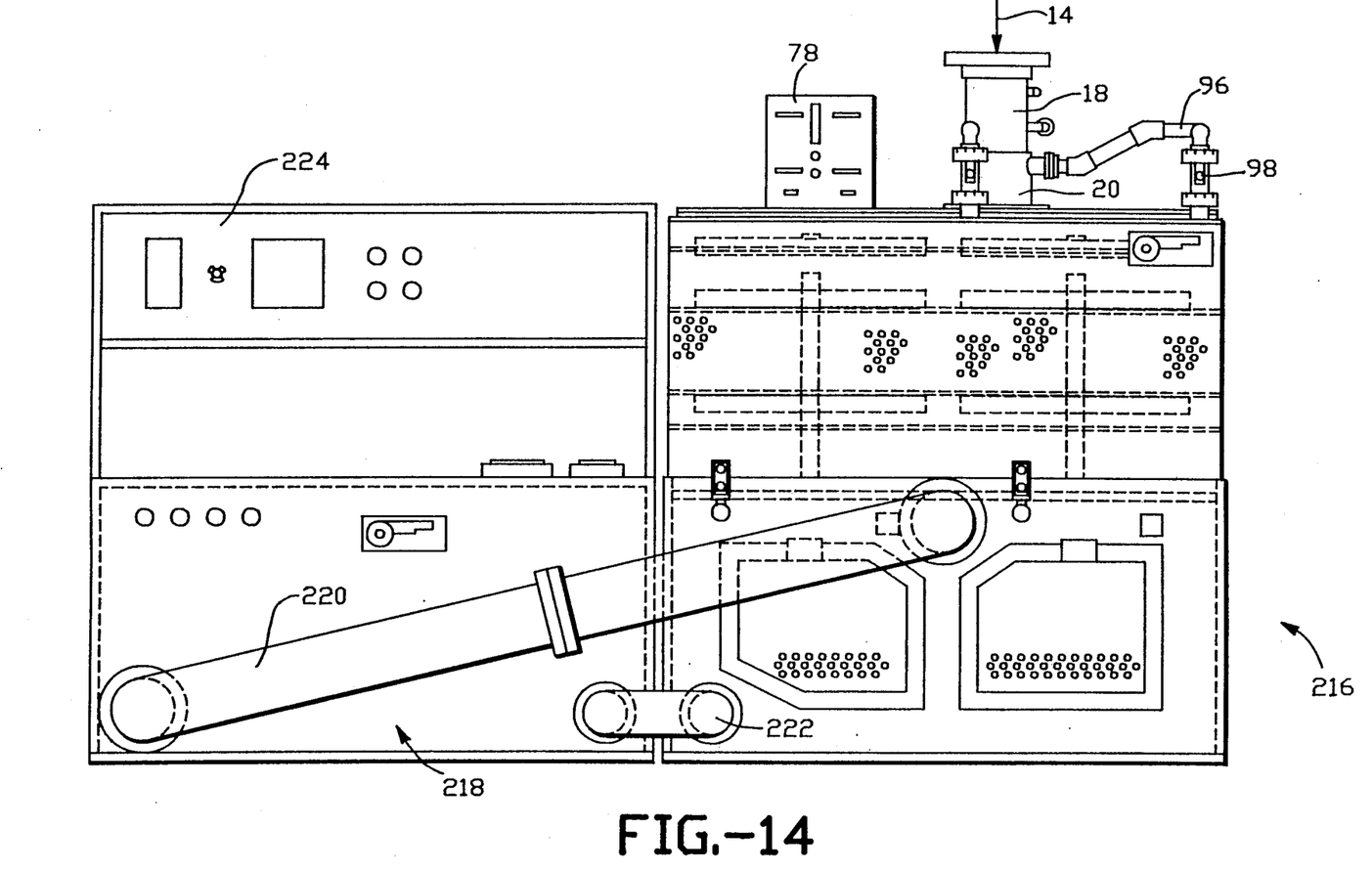
FIG. 14 is a front view in elevation of a closed loop fume scrubber system incorporating principles of the present invention.
Figure 15:
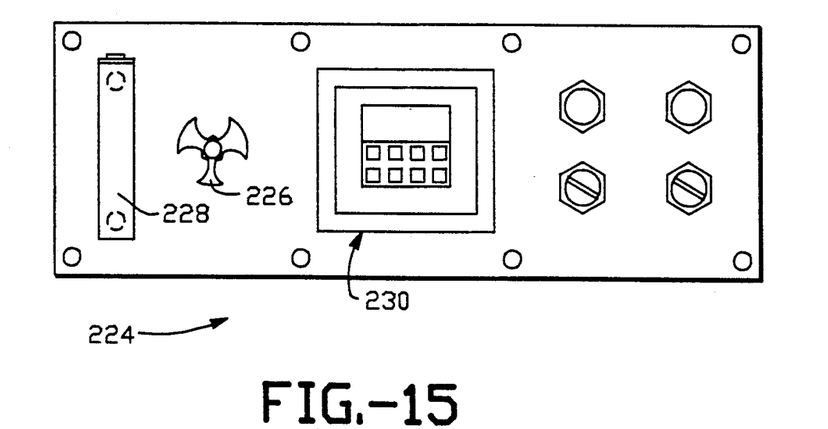
FIG. 15 is a front view of a controller element for the FIG. 14 closed loop scrubber system.

FIGS. 14 and 15 illustrate apparatus for adapting the scrubber 216 to closed loop operation. A recirculation tank 218 is connected by conduits 220 and 222 to the scrubber 216. Coolant coils may be provided for drawing heat away from the tank 218, and a control panel 224 may be provided atop the tank 218. The control panel 224, depicted in FIG. 11 provides a control 226 for regulating the flow through the cooling loop, as measured by a flowmeter 228. A pH controller 230 enables positive pH correction of the chemical scrubbing agent via a suitable pH correction processor contained within the housing of the tank 218. A main power switch 232, main power indicator lamp 234, pump out switch 236 and pump out indicator lamp 238 may also be included in the control panel 224. In the closed loop configuration, the switches 232 and 236, and indicator lamps 234 and 238 are used to control and monitor the pump motors 106 and the pressure switches 148 of the scrubber 216. The tank housing may also include a reservoir for a low pH neutralization agent, such as sodium hydroxide or other suitable alkaline solution.

To those skilled in the art to which the present invention pertains many changes and widely varying embodiments will suggest themselves. The foregoing description is presented by way of illustration only and should not be construed as limiting the present invention, the scope of which is more particularly pointed out in the following claims.

We claim:

1. A hydrodynamic fume scrubber for scrubbing a gaseous phase effluent with a scrubbing liquid, the fume scrubber comprising:

inlet means for receiving the particulate laden gaseous effluent into the scrubber and for providing a first effluent to scrubbing fluid interface, negative pressure providing means for drawing a stream of the effluent passing from the inlet means into a first pressurized component of the scrubbing liquid in a manner generating negative pressure with respect to the effluent, a main scrubbing chamber including:

means for receiving the first pressurized component of the scrubbing liquid and the effluent stream from the negative pressure providing means into an upper region of the chamber, hydrodynamic spray means driven by a second pressurized component of the scrubbing liquid for hydrodynamically spraying the second component throughout the upper region of the chamber, filter media means disposed in a central region of the chamber for filtering and mixing the effluent gas and scrubbing liquid thereby to promote dissolution of components within the effluent which are soluble in the scrubbing liquid, a scrubbing liquid, scrubbed gas separation region within the chamber below the filter media means for separating and discharging scrubbed gas effluent collected therein, splash plate means at the lower boundary of the separation region for further breaking up particle masses formed within the scrubbing liquid as it drips from a lower surface of the filter media means through the separation region, scrubbing liquid reservoir means below the splash plate means in a lowermost region of the chamber for receiving excess scrubbing liquid, the scrubber further comprising scrubbing liquid supply means for supplying scrubbing liquid to the scrubber from a source thereof, and discharge means for discharging scrubbing liquid from the reservoir means at a flow rate approximating the flow rate of scrubbing liquid incoming from the supply means.

2. The hydrodynamic fume scrubber set forth in claim 1 further comprising recirculation pump means for receiving a portion of the scrubbing liquid from the reservoir means and for providing the first and second components of scrubbing liquid under pressure respectively to the negative pressure providing means and to the hydrodynamic spray means.

3. The hydrodynamic fume scrubber set forth in claim 2 wherein the recirculation pump means is contained in a housing formed below the scrubbing chamber, the housing providing a secondary containment for the scrubbing liquid.

4. The hydrodynamic fume scrubber set forth in claim 2 further comprising swash plate means disposed in the scrubbing liquid reservoir means in cooperation with an inlet to the recirculation pump means, for causing the scrubbing liquid collected therein to swash and circulate therein in order to prevent buildup of particulate residues scrubbed from the gaseous effluent.

5. The hydrodynamic fume scrubber set forth in claim 1 wherein the inlet means comprises a structure defining a pressurized inert gas plenum region directly communicating with a source of the gas effluent and a scrubbing liquid chamber region directly below the gas plenum region and forming a gas to scrubbing liquid interface therewith, and scrubbing liquid spillway means formed at the interface for enabling flow of scrubbing liquid from the chamber region and concurrent passage of incoming gaseous effluent and a mixing gas from the plenum region therethrough, the inert gas plenum region being supplied with an inert mixing gas under pressure for mixing with the incoming gaseous effluent, and the scrubbing liquid chamber region being supplied with a portion of the scrubbing liquid.

6. The hydrodynamic fume scrubber set forth in claim 5 wherein the portion of scrubbing liquid supplied to the scrubbing liquid is provided directly from the scrubbing liquid supply means, and further comprising recirculation pump means for receiving a portion of the scrubbing liquid from the reservoir means and for providing the first and second components of scrubbing liquid under pressure respectively to the negative pressure providing means and to the hydrodynamic spray means.

7. The hydrodynamic fume scrubber set forth in claim 5 wherein the negative pressure providing means comprises a tube and nozzle means for directing the scrubbing liquid toward the tube, thereby to create the negative pressure and to promote mixture of the incoming gaseous effluent with the scrubbing liquid.

8. The hydrodynamic fume scrubber set forth in claim 1 further comprising an outer container for surrounding and containing the scrubbing chamber, the space between the outer container and the scrubbing chamber defining a temperature control plenum for regulating the ambient temperature of the scrubbing chamber.

9. The hydrodynamic fume scrubber set forth in claim 8 wherein a heating gas is supplied to the temperature control plenum to raise the tempera of the scrubbing chamber.

10. The hydrodynamic fume scrubber set forth in claim further comprising recirculation pump means for receiving a portion of the scrubbing liquid from the reservoir means and for providing the first and second components of scrubbing liquid under pressure respectively to the negative pressure providing means and to the hydrodynamic spray means, heat from the recirculation pump means being conducted in an airstream into the temperature control plenum thereby to heat the mixing chamber.

11. The hydrodynamic fume scrubber set forth in claim 1 wherein the scrubbing liquid is water.

12. The hydrodynamic fume scrubber set forth in claim 11 wherein the supply means for supplying the water communicates directly with a municipal water supply; the supply means further comprising recirculation pump means for receiving a portion of the water from the reservoir means and for providing the first and second components of water under pressure respectively to the negative pressure providing means and to the hydrodynamic spray means; and, recirculation pump bypass means including solenoid valve means for bypassing the recirculation pump by supplying water from the municipal water supply directly to the negative pressure providing means and to the hydrodynamic spray means in the event of failure of the recirculation pump means, thereby to continue operation of the hydrodynamic fume scrubber with increased water flow.

13. The hydrodynamic fume scrubber set forth in claim 1 wherein the filter media means comprises a multiplicity of discrete, generally spherical ribbed packing cells.

14. The hydrodynamic fume scrubber set forth in claim 1 wherein the gaseous phase effluent originates in a sequenced manufacturing process and further comprising automatic sequencing controller means responsive to the manufacturing process for automatically starting and stopping operation of the fume scrubber in response to the operating conditions of the manufacturing process.

15. The hydrodynamic fume scrubber set forth in claim 1 further comprising housing means, said housing means providing secondary containment of the scrubbing liquid.

16. The hydrodynamic fume scrubber set forth in claim 1 wherein the hydrodynamic spray means comprises a mass balanced rotatable nozzle assembly mounted axially over a central conduit extending upwardly within the chamber, the flow of the second component of scrubbing liquid causing the rotatable nozzle assembly to rotate and spray the scrubbing liquid evenly throughout the upper region of the scrubbing chamber.

17. The hydrodynamic fume scrubber set forth in claim 16 wherein the rotatable nozzle assembly comprises a plurality of spray arms evenly spaced about and extending from a peripheral manifold of the assembly.

18. The hydrodynamic fume scrubber set forth in claim 1 wherein the discharge means includes a drain pipe having an opening aligned with the top of the scrubbing liquid reservoir means so as to establish the level of scrubbing liquid stored within the reservoir means, the drain pipe sized to discharge the scrubbing liquid at a rate no less than the maximum rate of supply of the scrubbing liquid from the supply means.

* * * * *